United States Patent
Zilberberg et al.

(10) Patent No.: US 9,570,938 B2
(45) Date of Patent: Feb. 14, 2017

(54) SYSTEM, APPARATUS AND METHOD FOR UNINTERRUPTIBLE POWER SUPPLY

(75) Inventors: Ofer Zilberberg, Tel Aviv (IL); Eli Flaxer, Tel Aviv (IL)

(73) Assignee: POWER OFFER ELECTRONICS LTD., Bnei Brak (IL)

( * ) Notice: Subject to any disclaimer, the term of this patent is extended or adjusted under 35 U.S.C. 154(b) by 617 days.

(21) Appl. No.: 14/110,170

(22) PCT Filed: Apr. 5, 2012

(86) PCT No.: PCT/IL2012/050129
§ 371 (c)(1),
(2), (4) Date: Nov. 5, 2013

(87) PCT Pub. No.: WO2012/137210
PCT Pub. Date: Nov. 10, 2012

(65) Prior Publication Data
US 2014/0042813 A1    Feb. 13, 2014

Related U.S. Application Data

(60) Provisional application No. 61/472,518, filed on Apr. 6, 2011.

(51) Int. Cl.
*H02J 9/00* (2006.01)
*H02J 3/00* (2006.01)
(Continued)

(52) U.S. Cl.
CPC .. *H02J 9/00* (2013.01); *H02J 3/00* (2013.01); *H02J 9/06* (2013.01); *H02M 7/797* (2013.01); *Y10T 307/549* (2015.04)

(58) Field of Classification Search
CPC .................. H02J 9/00; H02J 3/00; H02J 9/06; H02M 7/797; Y10T 307/549
(Continued)

(56) References Cited

U.S. PATENT DOCUMENTS 4,313,060 A    1/1982   Fickenscher et al.
4,719,550 A    1/1988   Powell et al.
(Continued)

FOREIGN PATENT DOCUMENTS

WO    WO 2008/024529    2/2008

OTHER PUBLICATIONS

Pradeep K. Sood and Thomas A. Lipo "power conversion Distribution System Using a High-frequency AC link" vol. 24 No. 2 Apr. 1988.*

(Continued)

*Primary Examiner* — Jared Fureman
*Assistant Examiner* — Emmanuel R Dominique
(74) *Attorney, Agent, or Firm* — Pearl Cohen Zedek Latzer Baratz LLP (57) ABSTRACT

An uninterruptible power supply device, and method of use thereof, including a multiple-input source AC converter for receiving an AC input voltage and a DC input voltage, an inverter including a combiner module for combining the input power sources, and an AC/AC switching transformer, the inverter being controlled by a controller to provide an output voltage signal, the controller configured to sample the input voltage signal, the switching signal current and the output voltage signal, and to control the switching transformer based thereon so as to render the output voltage signal sinusoidal.

14 Claims, 9 Drawing Sheets

(51) Int. Cl.
*H02J 9/06* (2006.01)
*H02M 7/797* (2006.01)

(58) Field of Classification Search
USPC .......................................................... 307/64
See application file for complete search history.

(56) References Cited

U.S. PATENT DOCUMENTS

| | | | |
|---|---|---|---|
| 4,782,241 A | 11/1988 | Baker et al. | |
| 4,823,247 A | 4/1989 | Tamoto | |
| 5,029,064 A * | 7/1991 | Ball ...................... | H02M 7/797 307/3 |
| 5,081,367 A | 1/1992 | Smith et al. | |
| 6,201,371 B1 | 3/2001 | Kawabe et al. | |
| 6,768,223 B2 | 7/2004 | Powell et al. | |
| 2003/0048004 A1 * | 3/2003 | Fleming ................. | H02J 3/005 307/64 |
| 2004/0212580 A1 * | 10/2004 | Kim ..................... | G09G 3/3406 345/102 |
| 2005/0121067 A1 * | 6/2005 | Toyomura ......... | H01L 31/02021 136/244 |
| 2008/0055940 A1 * | 3/2008 | Lawson .................. | H02M 1/10 363/16 |
| 2009/0000654 A1 * | 1/2009 | Rotzoll ................. | H02M 7/493 136/244 |
| 2009/0153113 A1 | 6/2009 | Zilberberg | |
| 2010/0148587 A1 | 6/2010 | Khaligh | |
| 2014/0001864 A1 * | 1/2014 | Nirantare .......... | H01L 31/02021 307/71 |

OTHER PUBLICATIONS

International Search Report for Application No. PCT/IL2012/050129, mailed on Sep. 13, 2013.

Sood, P. K. et al. "Power conversion distribution system using a resonant high-frequency AC link" Industry Applications, IEEE Transactions on (vol. 24, No. 2), pp. 288-300, Apr. 1, 1988.

* cited by examiner

Fig. 5 a) Bidirectional IGBT Switch
Fig. 6 b) Bidirectional MOSFET Switch
Fig. 7 c) Operation modes
Fig. 8

| Q1 | Buck-Buck | Buck-Boost | Boost-Buck | Boost-Boost |
|---|---|---|---|---|
| S1A | \|Vin\|≥\|Vbat\| | \|Vin\|≥\|Vbat\| | \|Vin\|≥\|Vbat\| | \|Vin\|≥\|Vbat\| |
| S1B | Ton1 | Ton1 | Ton1 | Ton1 |
| S2A | On | On | On | On |
| S2B | Off | Off | Off | Off |
| S3A | Off | On | On | On |
| S3B | Off | Ton2 | Ton1 | Ton1+Ton2 |
| S4A | On | On | On | On |
| S4B | On | Ton2 | Ton1 | Free Wheel |
| S5pA | \|Vbat\|>\|Vin\| | \|Vbat\|>\|Vin\| | \|Vbat\|>\|Vin\| | \|Vbat\|>\|Vin\| |
| S5pB | Ton2 | Ton2 | Ton2 | Ton2 |
| S5nA | Off | Off | Off | Off |
| S5nB | Off | Off | Off | Off |

Table 1
Fig. 15A

| Q2 | Buck-Buck | Buck-Boost | Boost-Buck | Boost-Boost |
|---|---|---|---|---|
| S1A | \|Vin\|≤\|Vbat\| | \|Vin\|≤\|Vbat\| | \|Vin\|≤\|Vbat\| | \|Vin\|≤\|Vbat\| |
| S1B | Off | Off | Off | Off |
| S2A | On | On | On | On |
| S2B | Free Wheel | Free Wheel | Free Wheel | Free Wheel |
| S3A | On | On | On | On |
| S3B | Off | Off | Off | Off |
| S4A | On | On | On | On |
| S4B | On | Ton2 | Ton1 | Free Wheel |
| S5pA | \|Vbat\|<\|Vin\| | \|Vbat\|<\|Vin\| | \|Vbat\|<\|Vin\| | \|Vbat\|<\|Vin\| |
| S5pB | Off | Off | Off | Off |
| S5nA | Off | Off | Off | Off |
| S5nB | Off | Off | Off | Off |

Table 2
Fig. 15B

| Q3 | Buck-Buck | Buck-Boost | Boost-Buck | Boost-Boost |
|---|---|---|---|---|
| S1A | Ton1 | Ton1 | Ton1 | Ton1 |
| S1B | $|Vin| \geq |Vbat|$ | $|Vin| \geq |Vbat|$ | $|Vin| \geq |Vbat|$ | $|Vin| \geq |Vbat|$ |
| S2A | Off | Off | Off | Off |
| S2B | On | On | On | On |
| S3A | Off | Ton2 | Ton1 | Ton1+Ton2 |
| S3B | Off | On | On | On |
| S4A | On | $\overline{Ton2}$ | $\overline{Ton1}$ | Free Wheel |
| S4B | On | On | On | On |
| S5pA | Off | Off | Off | Off |
| S5pB | Off | Off | Off | Off |
| S5nA | Ton2 | Ton2 | Ton2 | Ton2 |
| S5nB | $|Vbat| > |Vin|$ | $|Vbat| > |Vin|$ | $|Vbat| > |Vin|$ | $|Vbat| > |Vin|$ |

Table 3
Fig. 15C

| Q4 | Buck-Buck | Buck-Boost | Boost-Buck | Boost-Boost |
|---|---|---|---|---|
| S1A | Off | Off | Off | Off |
| S1B | $|Vin| \leq |Vbat|$ | $|Vin| \leq |Vbat|$ | $|Vin| \leq |Vbat|$ | $|Vin| \leq |Vbat|$ |
| S2A | Free Wheel | Free Wheel | Free Wheel | Free Wheel |
| S2B | On | On | On | On |
| S3A | Off | Off | Off | Off |
| S3B | On | On | On | On |
| S4A | On | $\overline{Ton2}$ | $\overline{Ton1}$ | Free Wheel |
| S4B | On | On | On | On |
| S5pA | Off | Off | Off | Off |
| S5pB | Off | Off | Off | Off |
| S5nA | Off | Off | Off | Off |
| S5nB | $|Vbat| < |Vin|$ | $|Vbat| < |Vin|$ | $|Vbat| < |Vin|$ | $|Vbat| < |Vin|$ |

Table 4
Fig. 15D

SYSTEM, APPARATUS AND METHOD FOR UNINTERRUPTIBLE POWER SUPPLY

CROSS-REFERENCE TO RELATED APPLICATIONS

This application is a National Phase Application of PCT International Patent Application No. PCT/IL2012/050129, entitled "SYSTEM, APPARATUS AND METHOD FOR UNINTERRUPTIBLE POWER SUPPLY", International Filing Date Apr. 5, 2012, published on Oct. 11, 2012 as International Patent Application Publication No. WO 2012/137210, which in turn claims priority from U.S. Provisional Patent Application No. 61/472,518, filed Apr. 6, 2011, both of which are incorporated herein by reference in their entirety.

FIELD OF THE INVENTION

The present invention is in the field of uninterruptible power supplies.

BACKGROUND OF THE INVENTION

Uninterruptible power supplies or sources (UPS) are used to provide emergency power to a load when the input power source, typically the utility mains, fails. A UPS typically provides near-instantaneous protection from input power interruptions by means of one or more attached batteries and associated electronic circuitry. The on-battery runtime of most uninterruptible power sources is relatively short, e.g., 5 to 15 minutes, but sufficient to allow time to bring an auxiliary power source on line, or to properly shut down the protected equipment.

Figure 1:
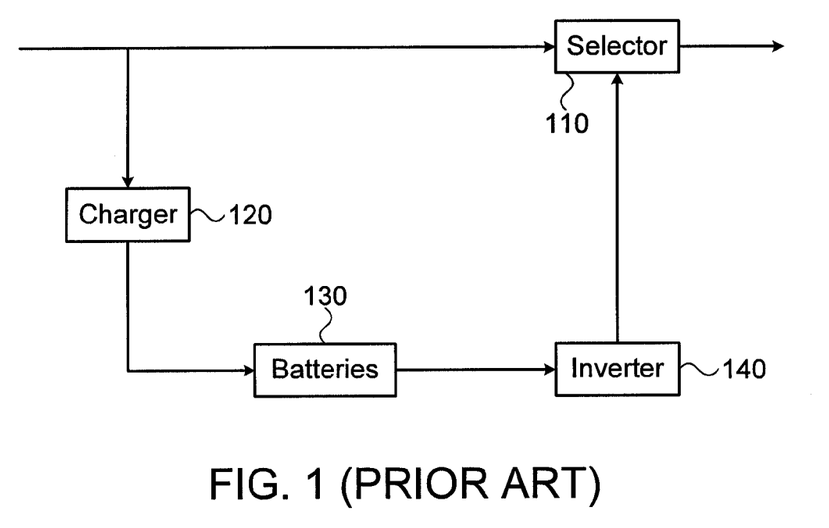
FIG. 1 is a schematic block diagram of a prior art off-line UPS arrangement.

FIG. 1 is a schematic block diagram of a prior art off-line UPS arrangement 100. When normal (mains) power is available, the selector 110 selects the mains power and supplies it to the load. In parallel, charger 120 is provided with power, and charges batteries 130, which are connected to an inverter 140 for converting direct current (DC) power from batteries 130 into alternating current (AC) power. When mains power is unavailable, selector 110 switches to receive power from the inverter 140, powered by batteries 130. However, the basic off-line UPS has a number of drawbacks. First, it may take a discernible time while the mains power drops below a threshold, and the selector switches to the inverter, thereby resulting in some small time of interrupted power. Therefore, in order to rectify this, the threshold may be raised; however, this may result in a greater number of switching events, some of which may not be blackouts, but small power dips or brownouts, thereby reducing battery life. An example of such a UPS arrangement may be seen in U.S. Pat. Nos. 4,823,247 and 5,081,367.

Figure 2:
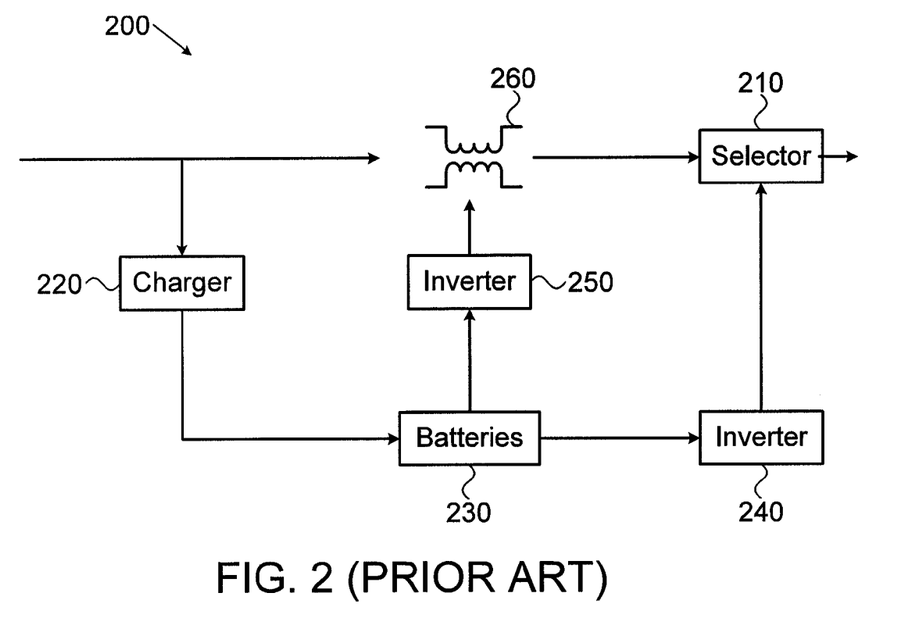
FIG. 2 is a schematic block diagram of a prior art line-interactive UPS arrangement.

FIG. 2 is a schematic block diagram of a prior art line-interactive UPS arrangement 200, which is an improvement on the off-line UPS of FIG. 1. Selector 210, charger 220, batteries 230, and inverter 240, have similar functionality as their corresponding parts in FIG. 1, described above. In addition, the batteries 230 power an inverter 250, which contributes to the line power. Accordingly, this internal regulation on the mains path reduces battery discharge during small fluctuations in the power waveform. However, one drawback of this arrangement is that fast transients nonetheless pass through to the load. Examples of online UPS systems include U.S. Pat. Nos. 4,313,060 and 6,201,371.

Figure 3:
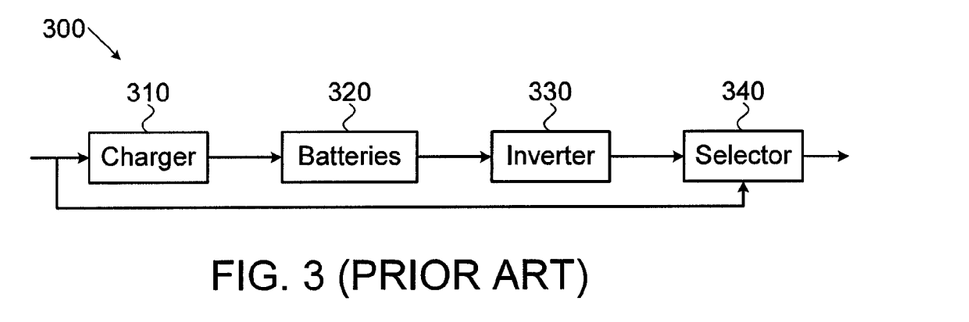
FIG. 3 is a schematic block depiction of a prior art dual conversion UPS arrangement.

FIG. 3 is a schematic block depiction of a prior art dual conversion UPS arrangement 300. In this arrangement, charger 310, batteries 320, inverter 330, and selector 340 are in the primary path, thereby providing power while the mains power is provided. Thus, the batteries are continually recharged and continually provide power to the inverter, which powers the load. The selector may bypass the batteries, for example, when mains power has been restored and the batteries are depleted. However, although the dual conversion arrangement overcomes some drawbacks of the other arrangements, it continually relies on battery power and an inverter, thereby providing power at very low efficiency. Examples of line-interactive UPS systems include U.S. Pat. Nos. 4,719,550 and 4,782,241.

Figure 4:
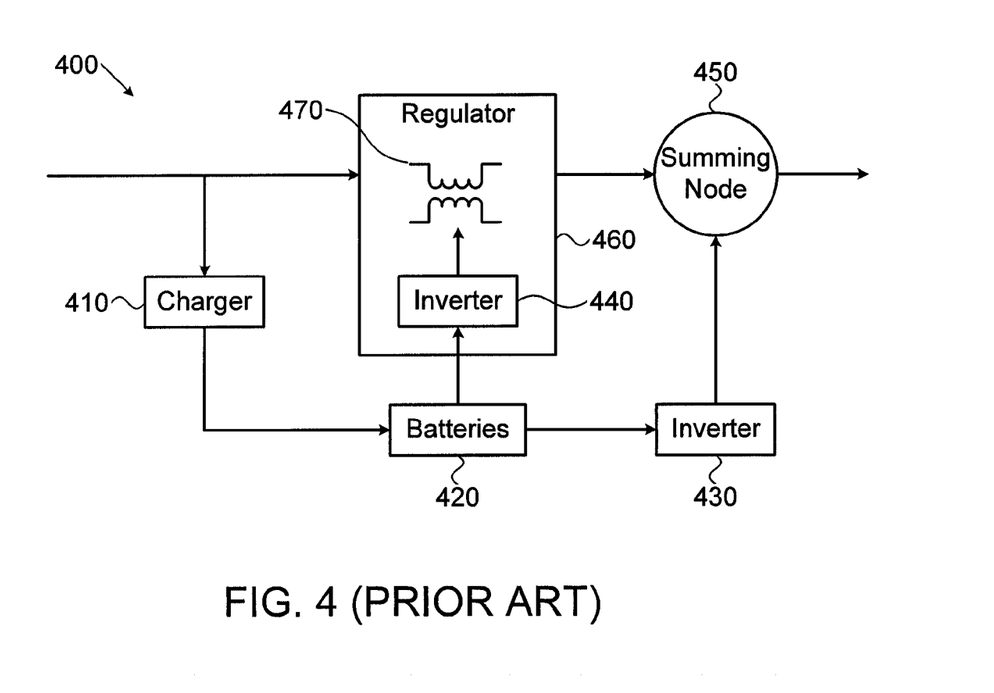
FIG. 4 is a schematic block depiction of a prior art delta conversion UPS arrangement.

Finally, FIG. 4 is a schematic block depiction of a prior art delta conversion UPS arrangement 400. Charger 410, batteries 420, and inverter 430 have similar functionality as in the previous arrangements. The internal inverter 440 provides internal regulation similar to the line-interactive arrangement of FIG. 2. In the delta conversion USP, however, the selector is replaced by a summing node 450. Therefore, rather than selecting which power source to use, which may cause detection and switching delays, the summing node provides to the load power from both sources simultaneously, drawing from the battery-powered inverter 440 power required to correct the mains power level. However, although an improvement on the other arrangements, the delta conversion UPS also suffers from disadvantages. In particular, any fast transient on the power mains will pass to the load due to the limited time response of the inverter and the architecture of the delta conversion regulation. In addition, the delta conversion will draw power from the battery-powered inverter for any voltage fluctuation, no matter how small. An example of a delta conversion UPS system includes U.S. Pat. No. 6,768,223.

There is a need for a UPS arrangement that overcomes at least some of the above drawbacks of the prior art UPS arrangements.

SUMMARY OF EMBODIMENTS OF THE INVENTION

According to embodiments of the invention, a system, apparatus and/or method may include an inverter adapted to receive at least a first input power from a first input source and a second input power from a second input source, and to provide an output AC voltage, wherein the inverter includes a combiner to combine the first and second input power to provide an intermediate signal, and an AC/AC switching transformer to transform the intermediate signal into the output AC voltage. A system, apparatus and/or method may further include a controller adapted to sample the input voltage signal, the switching signal current, and the output voltage signal, and based thereon, to control the inverter by providing control signals to the first and second bidirectional switching arrangements of the combiner to combine the first and second input power so as to provide the intermediate signal, and by providing control signals to the AC/AC switching transformer to render the output AC voltage signal substantially sinusoidal.

According to some embodiments, the combiner may comprise at least a first bidirectional switching arrangement associated with the first input power, and a second bidirectional switching arrangement associated with the second input power. According to some embodiments, the first and second bidirectional switching arrangements of the combiner may have at least four modes of operation, the modes of operation including an on mode, an off mode, a forward mode, and a reverse mode. According to some embodiments, each of the at least first and second bidirectional switching arrangements of the combiner comprise at least a forward transistor and a forward diode connected in parallel to a reverse transistor and a reverse diode, wherein the controller is to control the bidirectional switching arrangements of the combiner by providing switching signals to the respective forward and reverse transistors to select the desired mode of operation of the respective bidirectional switching arrangement. According to some embodiments, the AC/AC switching transformer comprises a buck-boost power section, the buck-boost power section including an inductor and a plurality of bidirectional switching arrangements.

According to some embodiments, the controller is to provide control signals to the bidirectional switching arrangements of the AC/AC switching transformer to render the output AC voltage signal substantially sinusoidal. According to some embodiments, each of the bidirectional switching arrangements of the AC/AC switching transformer comprises at least a forward transistor and a forward diode connected in parallel with a reverse transistor and a reverse diode, wherein the controller is to control the bidirectional switching arrangements of the AC/AC switching transformer by providing switching signals to the respective forward and reverse transistors.

According to some embodiments, the controller is to control the inverter using at least on input voltage polarity and output current polarity. According to some embodiments, the first input source is an AC power source, and the second input source is a DC power source. According to some embodiments, the second bidirectional switching arrangement associated with the second input source comprises at least a positive bidirectional switching arrangement associated with a positive DC voltage of the second input source and a negative bidirectional switching arrangement associated with a negative DC voltage of the second input source. According to some embodiments, the first and second input sources are AC power sources.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

UPS arrangements according to embodiments of the invention may reliably produce a sinusoidal output waveform, substantially irrespective of the input waveform. A UPS arrangement according to embodiments of the present invention may use a switching transformer with at least two power inputs, thereby providing high efficiency during normal operation, while blocking a variety of power quality issues introduced by the power grid. For example, according to embodiments of the invention, there may be provided a UPS arrangement having a dual input switching transformer, which receives input power from an input AC power and batteries. A combiner module may determine the weight of each input in the total output power, as follows:

$$PWr_{Output} = P \times Pwr_{ACInput} + (1-P) \times PWr_{Batteries},$$

where P is a coefficient having a value between 0 and 1 that determines the power ratio, $Pwr_{ACInput}$ is the power drawn from a first combiner input, which is connected to the input AC power, and $Pwr_{Batteries}$ is the power drawn from a second combiner input, which is connected to the batteries.

Providing output power using a combiner based on the above equation, according to embodiments of the present invention, may enable using a single conversion path from the power source to load in the various operation modes of the system (e.g., AC, DC, and mixed mode). Accordingly, embodiments of the invention may exhibit high reliability, rapid response, and efficient usage.

Figure 5:
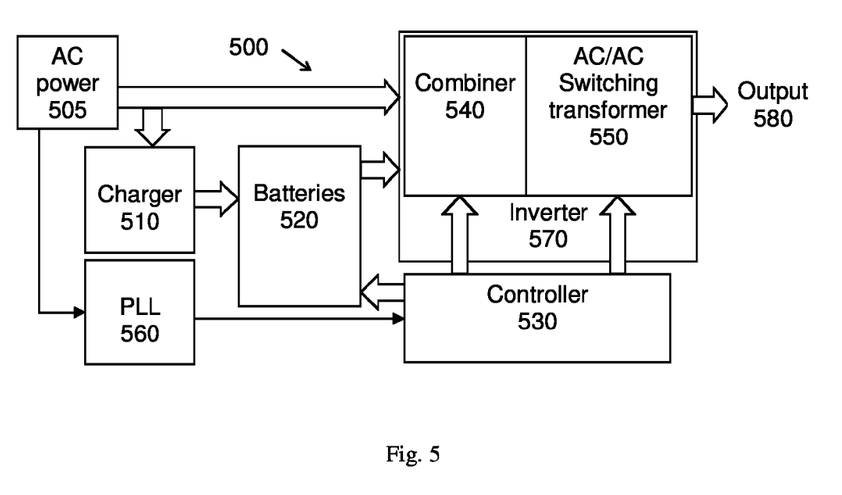
FIG. 5 is a schematic block depiction of a UPS arrangement according to an embodiment of the present invention.

FIG. 5 is a schematic block depiction of a UPS arrangement 500 according to an embodiment of the present invention. According to embodiments of the invention, power inverter 570 may accept at least two power inputs, e.g., AC mains power 505, and battery power 520, and provide one power output 580 by combining the power inputs as disclosed herein. The power inverter 570 may include two modules: combiner 540 and AC/AC switching transformer 550. During normal operation, for example, when the AC mains power provides a satisfactory amplitude and waveform, the power-ratio parameter P may be set to 1, and combiner 540 may substantially use the input mains voltage to power the switching transformer 550, described in further detail below. In parallel, charger 510 charges batteries 520, which supply a second DC input to the combiner 540, described in further detail below. In the normal operating state, combiner 540 does not substantially take power from the batteries, or may maintain a small portion of output power to be supplied from batteries as "keep alive" method to check DC path), thereby keeping batteries fully charged. Phase lock loop (PLL) 560 may track the polarity and phase of the AC input voltage ($V_{in}$), which may be based on the mains power, to provide timing signals to the controller 530 with the same phase as the input voltage. Controller 530 may control inverter 570, for example, by providing input control signals to combiner 540 and switching transformer 550. Accordingly, for example, controller 530 may use timing signals from PLL 560 to sequence the combiner 540 to use batteries energy in the same frequency and phase as the main power energy.

During a power blackout, for example, when mains power fails to provide power, controller 530 may set the power-ratio parameter P to 0, in which case, all output power may be provided from the batteries 520. PLL 560 may be synchronized to an external synchronization signal provided by the controller 530. Accordingly, the controller 530 may control the timing parameters when the mains power is inoperative, thereby enabling the main controller to slowly shift the frequency, and readjust synchronization when input voltage returns or, when a new source voltage is present in the input voltage, e.g., when switching into generator voltage operation. When no synchronization source is available, the PLL 560 may maintain the last known frequency and phase.

Combiner 540 may use one or more of the input power sources to provide positive and negative power for AC/AC switching transformer 550. According to one embodiment of the invention, combiner 540 may use the positive portion of the batteries to power the positive portion of the sinusoidal output waveform, and the negative portion of the batteries to drive the negative portion of the sinusoidal output waveform, thus activating the combiner as a virtual square wave, synchronized to the timing indications generated by PLL 560. It will be understood that suitable square wave generator circuits may be used within the scope of the present invention, for example, for changing the DC voltage into a square wave in order to power the AC/AC converter input. For example, in an embodiment of the invention, combiner 540 may include a square wave generator to provide a positive voltage during the positive half of the sinusoidal output voltage, and a negative voltage during the negative half of the sinusoidal output voltage. It will be recognized that variations on the above basic structures are possible, for example, to obtain particular performance features as required. For example, when voltage frequency independence (VFI) is required, an input power factor correction (PFC) may be added as another input source for the combiner, in order to enable frequency changing during generator operation.

In the absence of an input voltage, the PLL may be synchronized to an external synchronization signal provided by the main controller. Accordingly, the controller may control the timing parameters when the mains power is inoperative, to enable the main controller to slowly shift the frequency, and readjust synchronization when input voltage returns or, when "new" source voltage is present in the input voltage (such as when switching into generator voltage operation). When no synchronization source is available, the PLL 560 may maintain the last known frequency and phase.

According to an embodiment of the invention, the inverter may include multiple sets of the combiner and switching transformer circuitry. For example, in a three-phase system, the combiner 540 and switching transformer 550 circuitry may contain three sets of switching elements, as compared to a single-phase system, which may include one set. Likewise, in a three-phase system, PLL 560 may provide three pairs of control signals, each with 120° phase shift from the other two. It will be understood that in a single-phase system, it may be possible to work with only one battery bank to obtain the dual polarity square wave output, by using full bridge switching.

Inverter 570 may accept as inputs an AC input voltage at one input, e.g., from an AC mains power, and a DC input voltage at another input, e.g., from the batteries, and based thereon output a sinusoidal output voltage with the required parameters. In some embodiments of the invention, the inverter 570 may use a buck-boost switching topology according to embodiments of the invention to handle inductive and capacitive loads that produce phase shift between voltage and current waveforms, as well as reflected energy from the load, using the switching architecture and timing to activate the switching elements, as described in herein.

Embodiments of the invention may use a bi-polar buck-boost switching topology circuit to provide an A/C voltage conversion ratio, changed by pulse width modulation (PWM) counters based on control signals provided by the main controller. The switching topology according to such embodiments may provide the ability to deal with loads having power factor (PF) less than or equal to one, as well as reflected energy. It will be understood that other suitable topologies are known for providing similar solutions, and are within the scope of the present invention. Moreover, although reference is made herein to transformer-less (non-isolated) topologies, it will be understood that the circuit described may be a transformed into an analogous fully isolated solution with synchronous rectification at the output, for example, using the same timing scheme and bi-polar switches as described herein.

Figure 6:
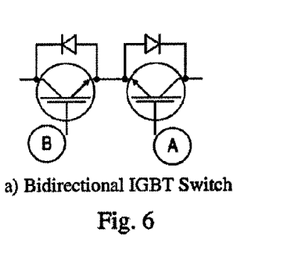
FIGS. 6 and 7 show examples of bidirectional switches that may be used in connection with embodiments of the present invention.
Figure 7:
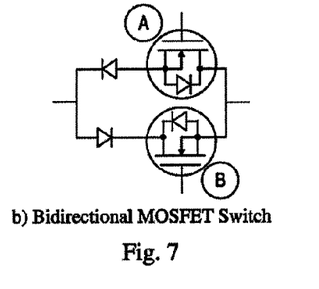

According to embodiments of the invention, a basic building block of the switching converter may be a bidirectional switch. According to embodiments of the invention, the bidirectional switch may be constructed using two transistors, for example, series-connected (FIG. 6), or parallel-connected with diodes (FIG. 7). This arrangement will generally result in four operating states of the switch: the switch may be off or on, as in a normal switch, and may also act as a diode in one direction or the other. The four operational states are shown schematically in FIG. 8.

Figure 9A:
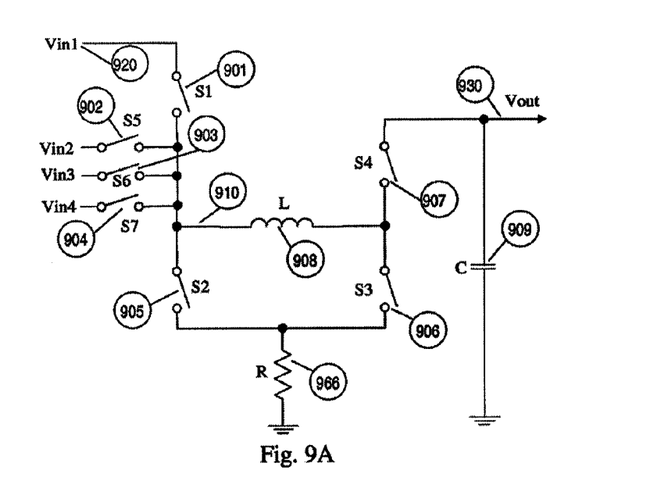
FIGS. 9A, 9B, and 9C depict a multi input switching topology circuit that may be used in accordance with embodiments of the invention.

Reference is made to FIG. 9A, which depicts a multiple input bidirectional H-bridge buck-boost switching topology circuit that may be used as an AC/AC switching transformer in accordance with embodiments of the invention. It will be understood that other circuits, for example, other buck-boost topologies, providing suitable functionality may likewise be used in accordance with embodiments of the invention.

Figure 8:
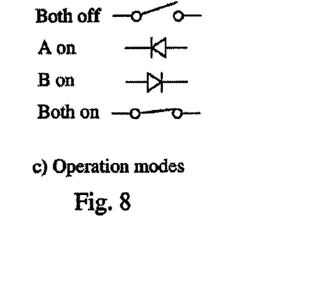
FIG. 8 is a schematic illustration of the operating modes of the bidirectional switches shown in FIGS. 6 and 7, which may be used in connection with embodiments of the present invention.

Each of the bidirectional switches 901, 902, 903, 904, 905, 906, and 907 may comprise a pair of transistors, which may operate in the modes of operation shown schematically in FIG. 8. When the control signal to the switch is high, the transistors conduct and permit current to flow; when the control signal to the switch is low, the transistors do not conduct and do not permit current to flow. Accordingly, each bidirectional switch can be imagined as an on/off switch, and selection of switches 901, 902, 903, and 904 may be used to select one or more input energy sources. Accordingly, this combiner portion of the inverter may select one or more input energy sources to be used alone or in combination to produce a desired intermediate signal at node 910.

Using the intermediate signal at node 910, the switches 905, 906, and 907 may operate as an AC/AC switching transformer to transform the intermediate signal to an AC output signal having desired form, e.g., sinusoidal form. By selecting the mode of operation of the appropriate switches of the AC/AC switching transformer, the controller may determine whether the configuration of the buck-boost power section.

As depicted, therefore, bidirectional switches 901 and 905 operate as a buck converter (step down) for Vin1 as an energy source; switches 902 and 905 operate as a buck converter for Vin2 as an energy source; switches 903 and 905 operate as a buck converter for Vin3 as an energy source; and switches 904 and 905 operate as a buck converter for Vin4 as an energy source. It will be understood that in the present embodiment, four energy sources are illustrated to demonstrate use with respect to positive and negative energy sources associated with each of two power sources; however, the invention is not limited in this regard, and more power sources may be used. Similarly, bidirectional switches 906 and 907 may operate as boost converter (step up) for the output.

In order to operate the switching transformer as a step down converter, bidirectional switch 907 may be turned on continuously, and bidirectional switch 906 may be turned off continuously. For purposes of simplicity, in the below example, only one energy source (Vin1) is assumed to be connected, while other sources (Vin2, Vin3, and Vin4) are disconnected using their respective switches (902,903,904). In this arrangement, bidirectional switches 901 and 905 may be each be provided with complementary pulse width modulation (PWM) signals, with duty cycle calculated to step down the voltage. Thus, for example, if the duty cycle of the signal is 50%, the AC voltage transfer ratio between $V_{in}$ and $V_{out}$ is 0.5. It will be understood that a signal with a duty ratio suitably greater than 50% provided to bidirectional switch 901 will result in a voltage transfer ratio between $V_{in}$ and $V_{out}$ greater than 0.5, while a signal with a duty ratio suitably less than 50% provided to bidirectional switch 901 will result in a voltage transfer ratio between $V_{in}$ and $V_{out}$ less than 0.5. The duty cycle of the pulse width modulation signals driving bidirectional switches 901 and 905 may be determined by the main controller, for example, based on a feedback loop as described in further detail hereinbelow.

Similarly, in order to operate the switching transformer as a step up converter, bidirectional switch 901 may be turned on, and bidirectional switch 905 may be turned off. In this configuration, inductor 908 and capacitor 909 may be used as the energy filter, while resistor R 966 provides a sample of the switching current to be used by the controller. Such an electronic transformer is described in further detail in co-pending U.S. Patent Publication No. 2009/0153113, which is assigned to the assignee of the present application, the contents of which are incorporated by reference herein. In this arrangement, bidirectional switches 906 and 907 may be each be provided with complementary pulse width modulation (PWM) signals, with duty cycle calculated to step up the voltage. Thus, for example, if the duty cycle of the signal is 50%, the AC voltage transfer ratio between $V_{in}$ and $V_{out}$ is 2. The duty cycle of the pulse width modulation signals driving bidirectional switches 906 and 907 may be determined by the main controller, for example, based on a feedback loop as described in further detail hereinbelow.

Figure 9B:
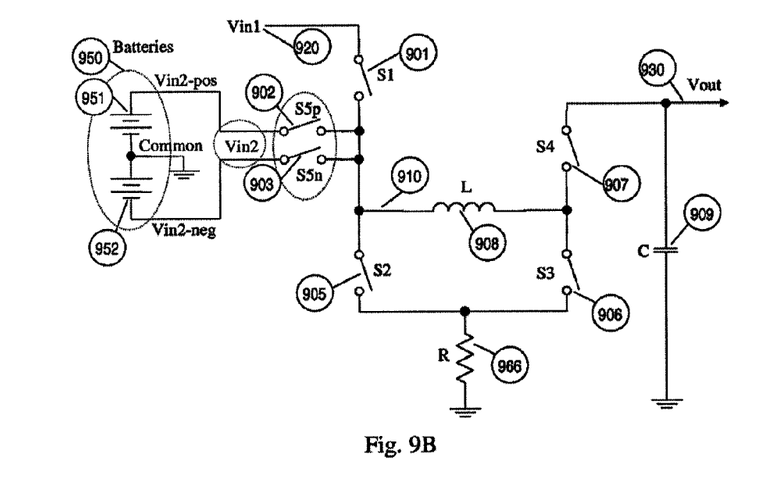

Reference is made to FIG. 9B, which shows the input switches 902 and 903 connected to positive and negative leads 951 and 952, respectively, of batteries 950, for use an energy source.

Figure 9C:
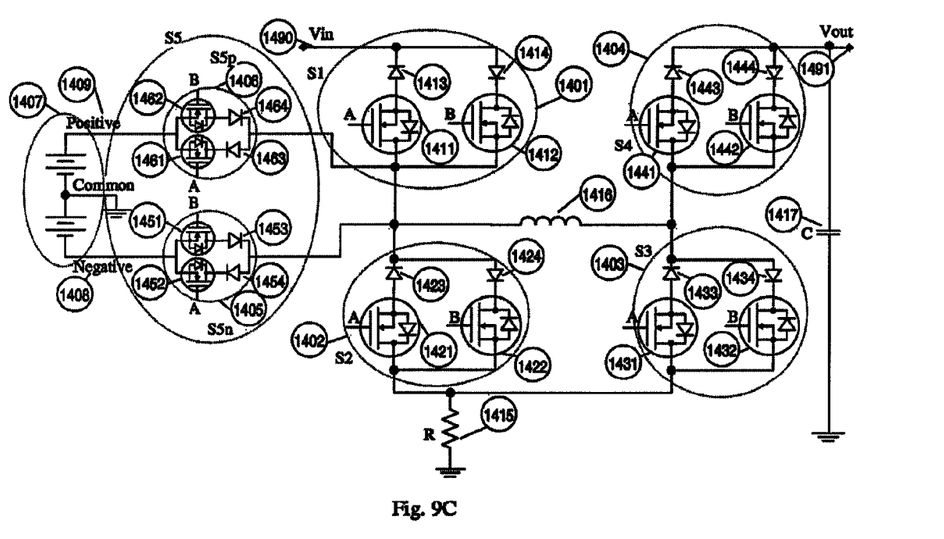

Reference is made to FIG. 9C, which is a schematic illustration of a dual input UPS inverter according to embodiments of the present invention, where one input is an AC voltage input Vin 1490 where the other input is a DC input voltage, where the battery voltage 1407 is divided into positive input 1409, and a negative input 1408. Each input may be associated with a bidirectional switch that can be controlled to operate so as to transmit power in either direction, and in addition to act as a free wheel diode and clamp device.

In the embodiment shown, each of the bidirectional switches includes two internal switching devices, each coupled with a switch: one switching device for the forward direction, referred to as A, and one switching device for the reverse direction, referred to as B. Accordingly, each switching control signal S may include two components: SA to control the forward direction, and SB to control the reverse direction. It will be recognized that each bidirectional switch has four operating modes: an "off" mode, in which both the forward and reverse switching devices are turned off; an "on" mode, in which both the forward and reverse switching devices are turned on; a "forward" mode, in which only the forward switching device is turned on; and a "reverse" mode, in which only the reverse switching device is turned on. According to embodiments of the invention, the operation mode for each of the bidirectional switches may be determined according to two independent parameters: the desired current direction, and the desired voltage polarity, thereby enabling operation in all four quadrants. The generation of these signals is described further below.

Switch 901, as shown in FIG. 9B, which is controlled by signals S1A and S1B, may be implemented by bidirectional switch arrangement 1401, which may include transistors 1411 and 1412 and diodes 1413 and 1414; switch 902, as shown in FIG. 9B, which is controlled by signals S5pA and S5pB, may be implemented by bidirectional switch arrangement 1406, which may include transistors 1461 and 1462 and diodes 1463 and 1464; switch 903, as shown in FIG. 9B, which is controlled by signals S5nA and S5nB, may be implemented by bidirectional switch arrangement 1405, which may include transistors 1451 and 1452 and diodes 1453 and 1454; switch 905, as shown in FIG. 9B, which is controlled by signals S2A and S2B, may be implemented by bidirectional switch arrangement 1402, which may include transistors 1421 and 1422 and diodes 1423 and 1424; switch 906, as shown in FIG. 9B, which is controlled by signals S3A and S3B, may be implemented by bidirectional switch arrangement 1403, which may include transistors 1431 and 1432 and diodes 1433 and 1434; switch 907, as shown in FIG. 9B, which is controlled by signals S4A and S5B, may be implemented by bidirectional switch arrangement 1404, which may include transistors 1441 and 1442 and diodes 1443 and 1444.

Figure 10:
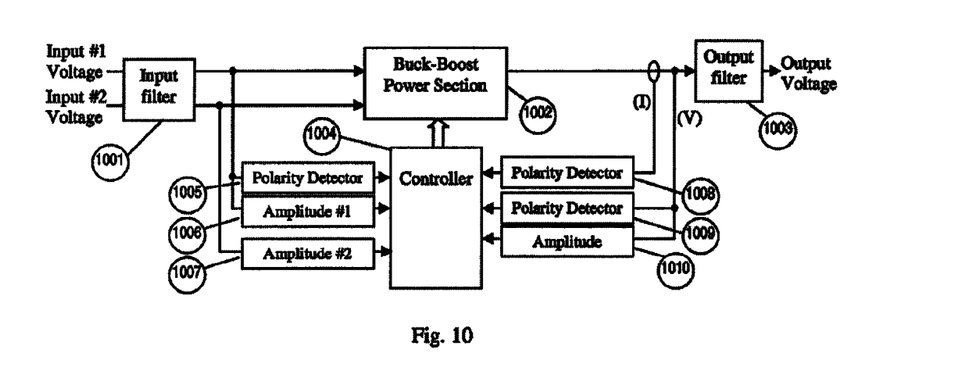
FIG. 10 depicts a schematic high level block diagram of a control system in accordance with embodiments of the invention.

Reference is made to FIG. 10, which depicts a schematic block diagram of a control system in accordance with embodiments of the invention. According to embodiments of the invention, controller 1004 may output PWM signals to control operation of the transistors of the buck-boost power converter 1002 to thereby maintain a pure sinusoidal waveform at the output filter 1003 for a wide variety of waveforms at the input. The controller may have as its inputs the amplitude 1006 and polarity 1005 of the input voltage, a sampled current polarity at the output of the buck-boost converter 1008, and the polarity 1009 and amplitude 1010 of the output voltage. Based on these input signals, controller may provide the control signals to control the switches of the buck-boost converter 1008, which may be as described, for example, in FIGS. 9A or 9B, above. Additionally, the input voltage signal, for example, a mains power signal, may be passed through an input filter 1001 prior to being stepped-up/stepped-down by the buck-boost converter, and the output voltage signal may be passed through an output filter 1003 prior to being output for use.

Figure 11:
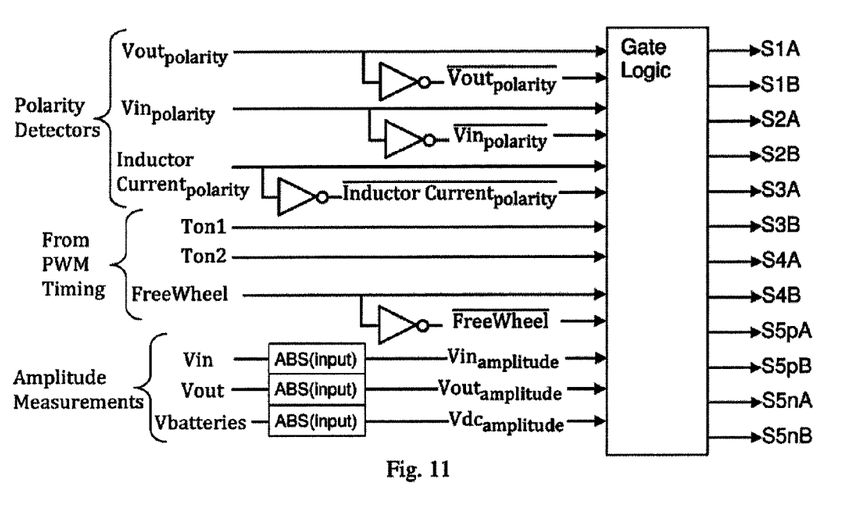
FIG. 11 depicts a schematic detailed block diagram of a controller according to embodiments of the present invention.

Reference is made to FIG. 11, which depicts the internal design of a controller according to an embodiment of the invention. According to the embodiment illustrated, the controller may comprise a state machine implemented by a gate logic unit having inputs which control the stated of the outputs. It will be recognized that the controller may be implemented in any suitable manner, e.g., logic gates, programmable microprocessor, etc. As described above, the controller may receive input signals, e.g., amplitude and polarity signals of the power signals, shown on the left, and provide, based on the input signals, output signals, shown on the right, e.g., for controlling the states of switches of the power switching converter. According to an embodiment of the invention, the controller's logic may be designed to implement the input/output relationships for each quarter, for example, as illustrated in Tables 1-4, discussed hereinbelow. The controller may use input signals such as input voltage, input voltage polarity, inductor current (also referred to switching signal current), inductor current polarity, and optionally output voltage (and/or their logical complements). In some embodiments of the invention, output polarity need not be used if the buck-boost delay is fast enough. Amplitudes of input sources and output voltage may be used as inputs to the controller. In addition, the controller may use as inputs PWM signals Ton1, Ton2, and FreeWheel timing signals. It will be recognized that the controller of FIG. 11 illustrates the output signals for activating a dual input inverter where one input is DC and other is AC, for example, as shown in FIG. 9C. It will be recognized that other embodiments may apply similar techniques to any number of inputs of any type.

Figure 12:
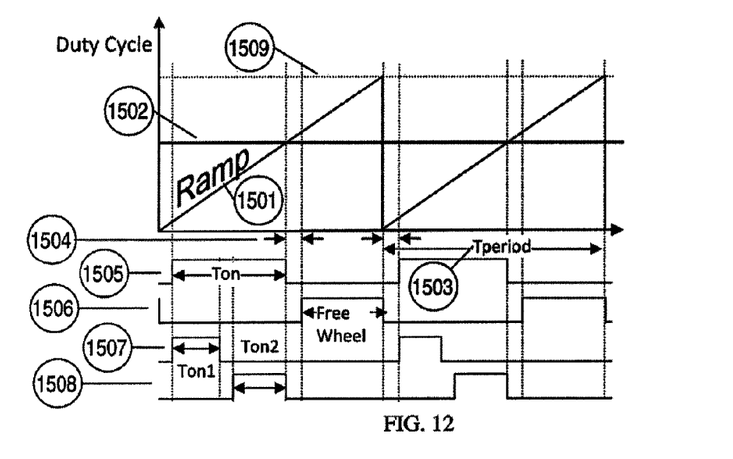
FIG. 12 depicts a pulse width modulation (PWM) timing diagram that may be used to explain activation of the dual inputs inverter in connection with embodiments of the present invention.

Reference is made to FIG. 12, which shows the production of the PWM timing signal to drive the individual switches according to an embodiment of the invention for an input signal, e.g., Vin1. Signals 1505 and 1506 may be generated according to ramp signal 1501 and the duty cycle threshold 1502, to serve as a drive signal and its complimentary signal to be connected to switches 901 and 905 respectively. For multiple input source operation where energy mixing between the input sources will take place, the total on-time 1505 may be divided among several signals. For the ease of explanation, the below discussion relates to an embodiment having two input sources Vin1 and Vin2.

Since both buck and boost converters use the inductor as a storage element, their signal sequence is based on two portions: (a) Ton, which represents the inductor's charge time, during which the inductor's current rises while the inductor receives energy from the input; and (b) Free wheel time, which represents the inductor's discharge time, during which the inductor current is reduced while transferring energy to the output.

Time segment Ton may be divided into several subsections, where in each section, the inductor current may come from a different input source. Thus, for example, as shown in FIG. 12, time Ton is divided into two separate signals: Ton1 1507 and Ton2 1508, each one representing an on time of a respective switch associated with a different energy source. It will be recognized that Freewheel time 1506 may also be subdivided between the inputs, for example, in the case of boost converting. Accordingly, during Ton1, switch 901 in FIG. 9, may be activated to take energy from Vin1, while during Ton2, switch 902 of FIG. 9 may be activated to take energy from Vin2 source.

According to embodiments of the invention, based on the amplitude of each individual source and the amplitude of the output voltage, each individual time slot (Ton1 or Ton2) may activate either a buck sequence (e.g., if Vin>Vout), or a boost sequence (e.g., if Vout<Vin). Thus 4 cases are possible: (a) Buck-Buck, when both inputs are higher than output voltage; (b) Buck-Boost, when Vin>Vout and Vdc (Battery voltage)<Vout; (c) Boost-Buck, when Vin<Vout and Vdc>Vout; and (d) Boost-Boost, when both input voltages lower than output voltage. Accordingly, the ratio between Ton1 and Ton2 will define the amount of energy taken from one source with respect to the amount of energy taken from the second source, that is:

$$P = \frac{Ton1}{Ton2},$$

where P is the energy ratio. Also, the ratio M to determine the total amount of energy transferred to the output, and thus used in a close control loop to regulate the output voltage may be described by:

$$M = \frac{(Ton1 + Ton2)}{Tperiod}.$$

According to embodiments of the invention, the timing sequence algorithm may also consider reflected energy as normally present on the grid, and also loads with cos(Φ)≠1, i.e. inductive and capacitive loads. In order to handle the change in current polarity, timing circuitry that takes into account both polarity of voltages and currents, as well as the amplitude of all inputs and outputs, may be used. It should be noted that according to embodiments of the invention, each switch should support full four-quadrant operation, where both switch voltage and switch current can work in both directions. In addition, according to embodiments of the invention, each switch should enable free wheel diode operation to clamp load reflected energy.

Figure 13:
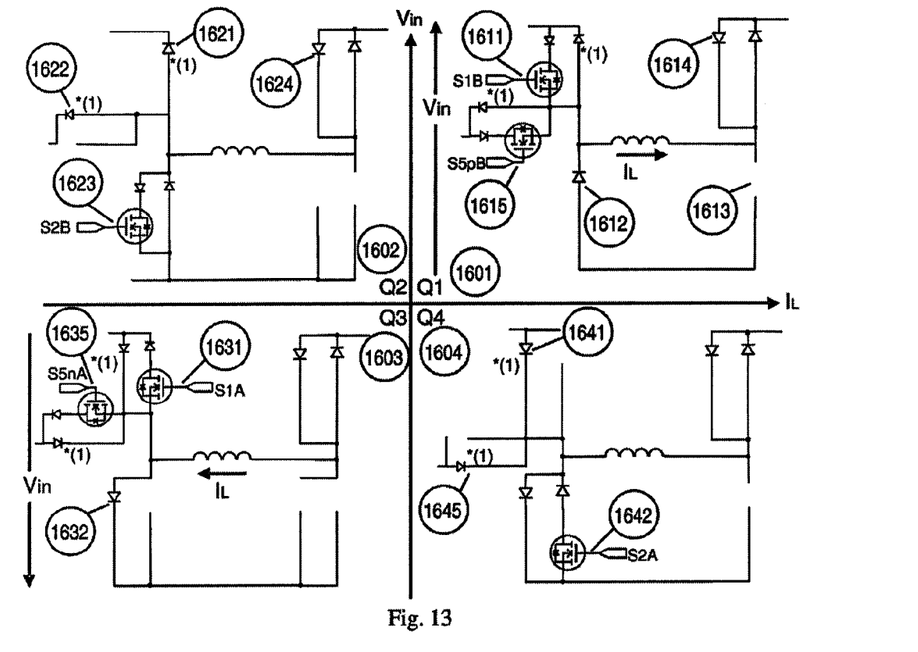
FIG. 13 depicts schematic illustrations of the converter topology for the input switch operations in the quadrant areas based on input voltage and input current, according to an embodiment of the invention.
Figure 14:
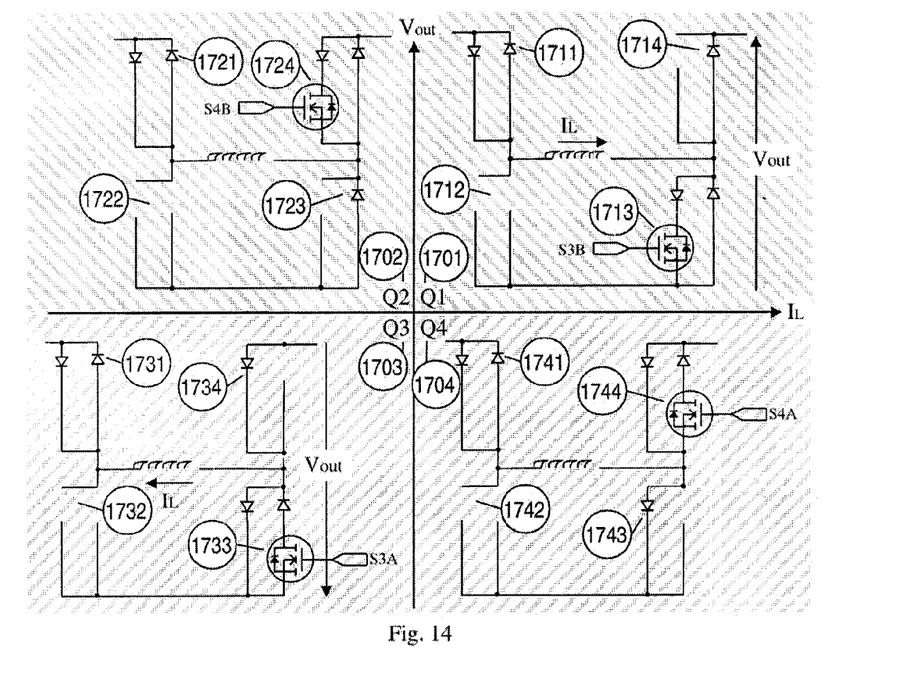
FIG. 14 depicts schematic illustrations of the converter topology for the output switch operations in the quadrant areas based on output voltage and input current, according to an embodiment of the invention.
Figure 15A:
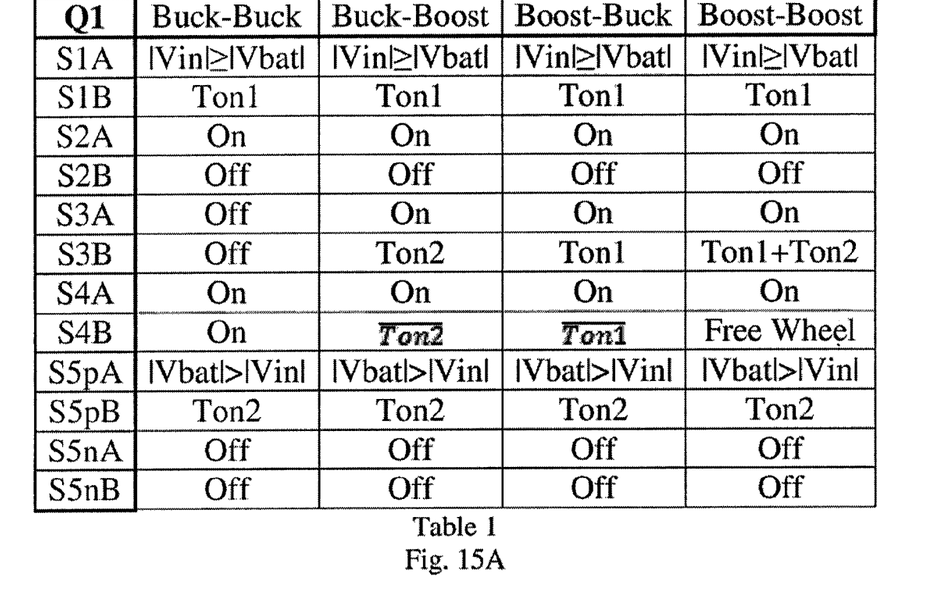
FIGS. 15A-15D depicts tables showing values of switching control signals for each switch in a dual input inverter according to embodiments of the present invention when operating in the four quadrants.
Figure 15B:
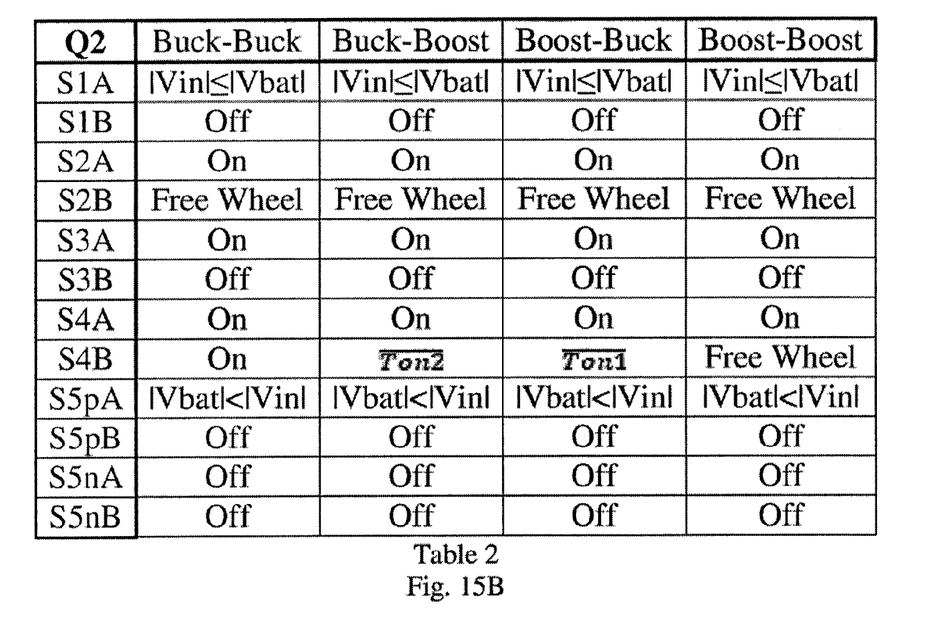
Figure 15C:
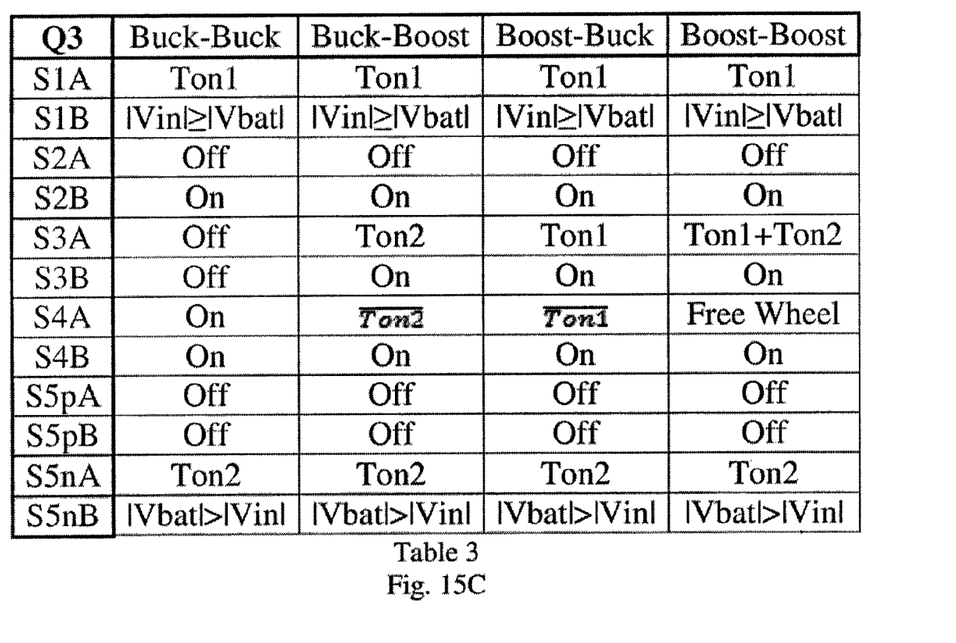
Figure 15D:
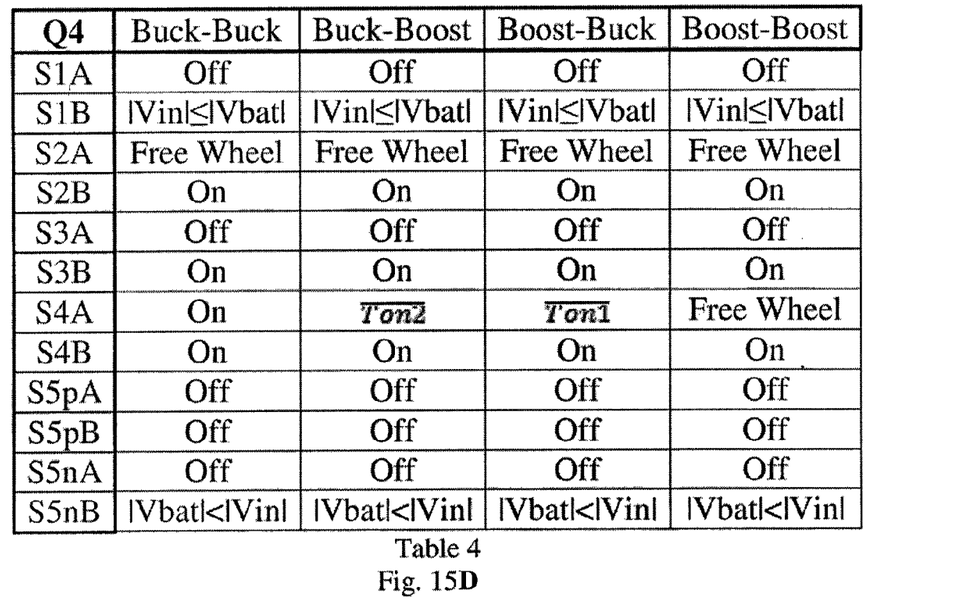

Reference is made to FIGS. 13 and 14, which show switch states according to the quadrant used. For simplicity, FIG. 13 shows the operation of input switches 901 (S1), 905 (S2) and 902/903 (S5), assuming buck operation mode, i.e. switch 906 (S3) is always off while switch 907 (S4) is always on, while FIG. 14 shows the four-quadrant operation of the output switches S3 and S4, showing, for simplicity switch 901 (S1) as being on and switch 905 (S2) as being off.

In the schematic diagram of FIG. 13, the states of the switches are presented in four "quadrants" each of which represents a different combination of input voltage and input current. The quadrants are described by inductor current (IL) across the inductor as the x-axis, and input voltage (Vin) as the y-axis. The four quadrants are labeled as Q1 1601, in which both input voltage (Vin) and input current across the inductor (IL) are positive; Q2 1602, in which input voltage is positive and input current is negative; Q3 1603, in which both input voltage and input current are negative; and Q4 1604, in which input voltage is negative and input current is positive. Although signal timing schemes for each switch according to a minimal transition scheme is described below, it will be noted that other, more complex, signaling schemes are possible within the scope of the invention.

When operation in quadrant Q1 1601 is needed, transistor B 1611 of bidirectional switch S1, i.e., S1B, may be pulsed by Ton1 signal, while transistor A of bidirectional switch S1 may be turned on continuously if the absolute value of the input voltage is greater than the absolute value of the battery voltage. Similarly, transistor B of bidirectional switch S5p 1615 will be pulsed by Ton2 signal while transistor A of bidirectional switch S5p will be turned on continuously if the absolute value of the battery voltage is higher than the absolute value of the input voltage. As discussed above, the relative pulse widths of Ton1 and Ton2 determine the amount of power obtained from each of the power sources.

When operation in quadrant Q2 1602 is needed, transistors S1A 1621 and S5pA 1625 operate continuously, depending on input has a higher absolute value than the absolute value of the other input. Switch S2B 1622 may be activated by the complementary signal of the free wheel time 1506, while S2A may be turned on continuously.

When operation in quadrant Q3 1603 is needed, transistor A 1631 of bidirectional switch S1, i.e., S1A, may be pulsed by Ton1 signal, while transistor B of bidirectional switch S1 may be turned on continuously if the absolute value of the input voltage is greater than the absolute value of the battery voltage. Similarly, transistor A of bidirectional switch S5p 1635 will be pulsed by Ton2 signal while transistor B of bidirectional switch S5p will be turned on continuously if the absolute value of the battery voltage is higher than the absolute value of the input voltage.

When operation in quadrant Q4 1604 is needed, transistors S1B 1641 and S5pB 1645 operate continuously, depending on input has a higher absolute value than the absolute value of the other input. Switch S2A 1622 may be activated by the complementary signal of the free wheel time 1506, while S2A 1642 may be turned on continuously.

Reference is made to FIG. 14, which describes boost operation of bidirectional switches 906 (S3) and 907 (S4). The quadrants are described by inductor current (IL) across the inductor as the x-axis, and output voltage (Vout) as the y-axis. For purposes of simplicity, a single input coming from S1 1711 is described, while S1 1711 is in the "on" position, and S2 1712 is in an "off" position. However, it will be understood that any combination of buck and boost operation is permitted combining the signaling from FIGS. 13 and 14.

When operation in quadrant Q1 1701 is needed, transistor B of switch S3, i.e., S1B 1713, may be activated based on Ton timing, while transistor A of switch S3 is turned on continuously. Likewise, transistor A of bidirectional switch S4 is turned on continuously.

When operation in quadrant Q2 1702 is needed, transistor A of bidirectional switch S3, i.e., S3A 1723, is turned on continuously, and transistor B of bidirectional switch S4, i.e., S4B 1724, is operated during freewheel period, while transistor A of bidirectional switch S4, i.e., at S4A, is turned on continuously.

When operation in quadrant Q3 1703 is needed, transistor A of switch S3, i.e., S1a 1733, may be activated based on Ton timing, while transistor B of switch S3 is turned on continuously. Likewise, transistor B of bidirectional switch S4 is turned on continuously.

When operation in quadrant Q4 1704 is needed, transistor B of bidirectional switch S3, i.e., S3B 1743, is turned on continuously, and transistor A of bidirectional switch S4, i.e., S4B 1744, is operated during freewheel period, while transistor B of bidirectional switch S4, i.e., at S4B, is turned on continuously.

Reference is made to FIGS. 15A-15D, which illustrate switching control values for transistors A and B of switches S1, S2, S3, S4, S5p, and S5n, depending on the desired topology (i.e., buck-buck, buck-boost, boost-buck, or boost-boost) for each of the four quadrants of operation Q1-Q4. The controller may be programmed to provide the desired switching control outputs of Tables 1-4 for the desired topology based on the input parameters described above. It will be recognized that although all switches are shown on the same table, the quadrant checking may be performed separately for S1, S2 and S5, whose quadrant determination is based on Vin and IL as indicated in FIG. 13, and for S3 and S4, whose quadrant determination is based on Vout and IL, as indicated by FIG. 14. According to the tables, when a Boolean expression is present, switch will be "on" when the result is "true", and "off" when result is "false". A bar on top of signal name indicates the logical inversion or complement of that signal. Although the tables illustrate operating principles for dual-input operation, where one of the inputs is DC and the other is AC, it will be recognized that principles of the present invention may be used to implement embodiments of the invention for any number of inputs. A controller operating according to the scheme of Tables 1-4 may enable working with substantially any AC load, with the ability to absorb reflected energy to the input. It will further be noted that other similar timing may be possible using a "minimum transitions" scheme to minimize the changing of switches position, as well as any other suitable operating scheme, consistent with the principles described herein.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A module comprising:
an inverter adapted to receive at least first input power from a first input source and second input power from a second input source, wherein at least one of the input sources is an AC input, and to provide an output AC voltage, wherein the inverter comprising an inductor, bidirectional input switches and bidirectional output switches, which form a combiner to combine the first and second input power to provide an intermediate signal, and an AC/AC switching transformer to transform the intermediate signal into the output AC voltage; and
a controller adapted to sample an input voltage signal, an inductor current, and an output voltage signal, and based thereon, to control the inverter by providing control signals to the bidirectional input switches and to the bidirectional output switches to combine the first and second input power so as to provide the intermediate signal, and to render the output AC voltage signal substantially sinusoidal,
wherein the controller is configured to provide the control signals to the bidirectional input switches based on polarity of the input voltage signal and on polarity of the inductor current, and to provide the control signals to the bidirectional output switches based on polarity of the output voltage signal and on the polarity of the inductor current.

2. The module of claim 1, wherein said bidirectional input switches and said bidirectional output switches of said inverter have at least four modes of operation, said modes of operation including an on mode, an off mode, a forward mode, and a reverse mode.

3. The module of claim 2, wherein each of said bidirectional input switches of said inverter comprise at least a forward transistor and a forward diode connected in parallel to a reverse transistor and a reverse diode, wherein the controller is to control said bidirectional input switches of the inverter by providing switching signals to the respective forward and reverse transistors to select the desired mode of operation of the respective bidirectional switches.

4. The module of claim 1, wherein said AC/AC switching transformer comprises a buck-boost power section, said buck-boost power section including the inductor and a plurality of bidirectional switches.

5. The module of claim 1, wherein each of said bidirectional output switches of said inverter comprises at least a forward transistor and a forward diode connected in parallel with a reverse transistor and a reverse diode, wherein the controller is to control said output switches of the inverter by providing switching signals to the respective forward and reverse transistors.

6. The module of claim 1, wherein the first input source is an AC power source, and the second input source is a DC power source.

7. The module of claim 6, wherein the bidirectional input switches comprise a second bidirectional switching arrangement associated with the second input source, the second bidirectional switching arrangement comprises at least a positive bidirectional switching arrangement associated with a positive DC voltage of the second input source and a negative bidirectional switching arrangement associated with a negative DC voltage of the second input source.

8. The module of claim 1, wherein the first and second input sources are AC power sources.

9. The module of claim 1, wherein said controller to provide the control signals to the bidirectional input switches according to four quadrants, wherein each quadrant represents a different combination of the polarity of the input voltage and the polarity of the inductor current, wherein:
in the first quadrant, the polarity of the input voltage is positive and the polarity of the inductor current is positive,
in the second quadrant, the polarity of the input voltage is positive and the polarity of the inductor current is negative,
in the third quadrant, the polarity of the input voltage is negative and the polarity of the inductor current is negative, and
in the fourth quadrant, the polarity of the input voltage is negative and the polarity of the inductor current is positive.

10. The module of claim 1, wherein said controller to provide the control signals to the bidirectional output switches according to four quadrants, wherein each quadrant represents a different combination of the polarity of the output voltage and the polarity of the inductor current, wherein:
in the first quadrant, the polarity of the output voltage is positive and the polarity of the inductor current is positive,
in the second quadrant, the polarity of the output voltage is positive and the polarity of the inductor current is negative,
in the third quadrant, the polarity of the output voltage is negative and the polarity of the inductor current is negative, and
in the fourth quadrant, the polarity of the output voltage is negative and the polarity of the inductor current is positive.

11. An interruptible power supply (UPS) device comprising a module, the module comprising:
an inverter adapted to receive at least first input power from a first input source and second input power from a second input source, wherein at least one of the input sources is an AC input, and to provide an output AC voltage, wherein the inverter comprising an inductor, bidirectional input switches and bidirectional output switches, which form a combiner to combine the first and second input power to provide an intermediate signal, and an AC/AC switching transformer to transform the intermediate signal into the output AC voltage; and
a controller adapted to sample an input voltage signal, an inductor current, and the an output voltage signal, and based thereon, to control the inverter by providing control signals to the bidirectional input switches and to the bidirectional output switches to combine the first and second input power so as to provide the intermediate signal, and to render the output AC voltage signal substantially sinusoidal,
wherein the controller is configured to provide the control signals to the bidirectional input switches based on polarity of the input voltage signal and on polarity of the inductor current, and to provide the control signals to the bidirectional output switches based on polarity of the output voltage signal and on the polarity of the inductor current.

12. The UPS of claim 11, wherein said controller to provide the control signals to the bidirectional input switches according to four quadrants, wherein each quadrant represents a different combination of the polarity of the input voltage and the polarity of the inductor current, wherein:

in the first quadrant, the polarity of the input voltage is positive and the polarity of the inductor current is positive, in the second quadrant, the polarity of the input voltage is positive and the polarity of the inductor current is negative, in the third quadrant, the polarity of the input voltage is negative and the polarity of the inductor current is negative, and in the fourth quadrant, the polarity of the input voltage is negative and the polarity of the inductor current is positive.

13. The UPS of claim 11, wherein said controller to provide the control signals to the bidirectional output switches according to four quadrants, wherein each quadrant represents a different combination of the polarity of the output voltage and the polarity of the inductor current, wherein:

in the first quadrant, the polarity of the output voltage is positive and the polarity of the inductor current is positive, in the second quadrant, the polarity of the output voltage is positive and the polarity of the inductor current is negative, in the third quadrant, the polarity of the output voltage is negative and the polarity of the inductor current is negative, and in the fourth quadrant, the polarity of the output voltage is negative and the polarity of the inductor current is positive.

14. A method of using the module to provide a substantially sinusoidal AC power signal using a plurality of input power sources, the module comprising:

an inverter adapted to receive at least first input power from a first input source and second input power from a second input source, wherein at least one of the input sources is an AC input, and to provide an output AC voltage, wherein the inverter comprising an inductor, bidirectional input switches and bidirectional output switches, which form a combiner to combine the first and second input power to provide an intermediate signal, and an AC/AC switching transformer to transform the intermediate signal into the output AC voltage; and a controller adapted to sample an input voltage signal, an inductor current, and an output voltage signal, and based thereon, to control the inverter by providing control signals to the bidirectional input switches and to the bidirectional output switches to combine the first and second input power so as to provide the intermediate signal, and to render the output AC voltage signal substantially sinusoidal, wherein the controller is configured to provide the control signals to the bidirectional input switches based on polarity of the input voltage signal and on polarity of the inductor current, and to provide the control signals to the bidirectional output switches based on polarity of the output voltage signal and on the polarity of the inductor current.

* * * * *